Figure 4:
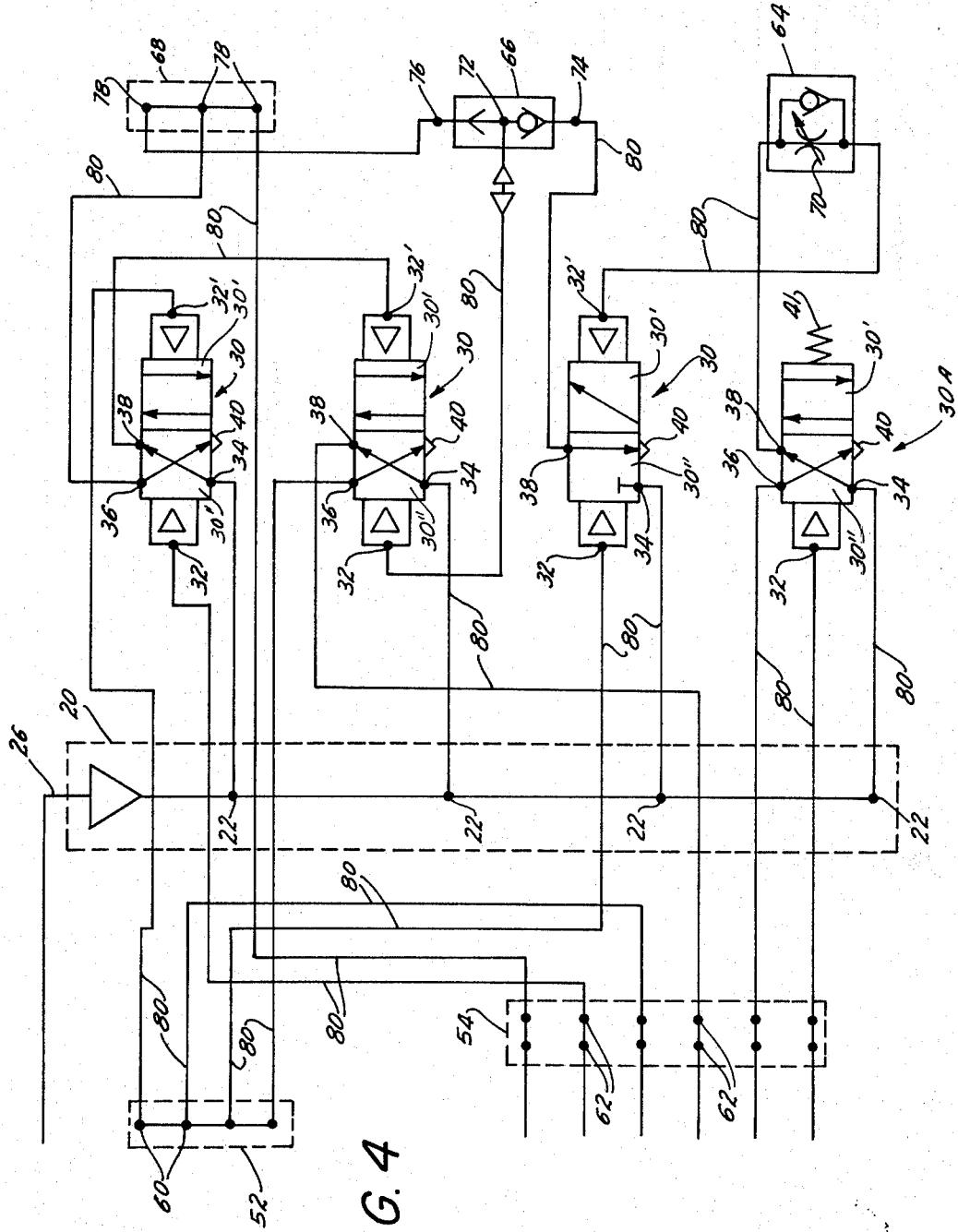

United States Patent
Kutz

[15] 3,698,432
[45] Oct. 17, 1972

[54] FLUID LOGIC MODULE ASSEMBLY WITH BUILT-IN MANIFOLD

[72] Inventor: Aaron Kutz, Forest Hills, N.Y.

[73] Assignee: Fluidic Controls Corporation, Hackensack, N.J.

[22] Filed: Oct. 8, 1970

[21] Appl. No.: 79,203

[52] U.S. Cl. .................. 137/608, 137/81.5, 137/271
[51] Int. Cl. .............................................. F17d 1/00
[58] Field of Search ...................... 137/608, 269, 271

[56] References Cited

UNITED STATES PATENTS

| | | | |
|---|---|---|---|
| 3,465,772 | 9/1969 | Monge et al. | 137/608 X |
| 3,561,469 | 2/1971 | Kellstrom | 137/608 X |
| 3,234,963 | 2/1966 | Lyon | 137/608 |
| 3,298,460 | 1/1967 | Porter et al. | 137/271 X |
| 3,384,115 | 5/1968 | Drazan et al. | 137/608 |
| 3,465,774 | 9/1969 | Kautz et al. | 137/608 X |
| 3,512,553 | 5/1970 | Legris | 137/271 X |
| 3,513,876 | 5/1970 | Tarbox | 137/608 X |
| 3,516,436 | 6/1970 | Klaus et al. | 137/608 X |

*Primary Examiner*—Samuel Scott
*Attorney*—James and Franklin

[57] ABSTRACT

A mounting base with a built-in manifold passage is provided, on which fluid logic modules, such as valves, control relays, fluid interconnection elements and the like may be mounted in various combinations and arrangements as desired, means being provided for ready fluid interconnection between the manifold and appropriate fluid logic modules.

4 Claims, 4 Drawing Figures

PATENTED OCT 17 1972
3,698,432
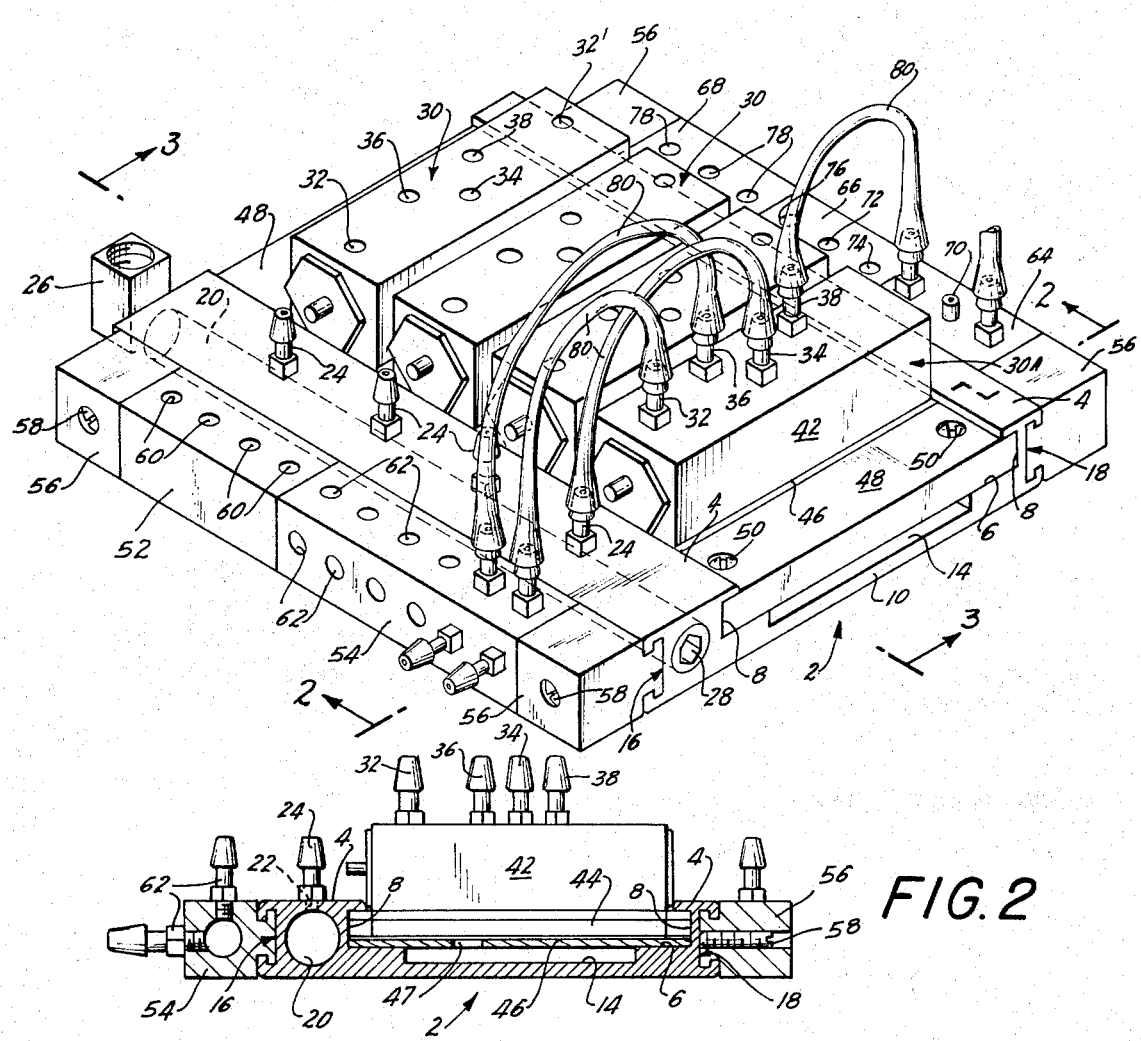
FIG. 1
FIG. 2
FIG. 3
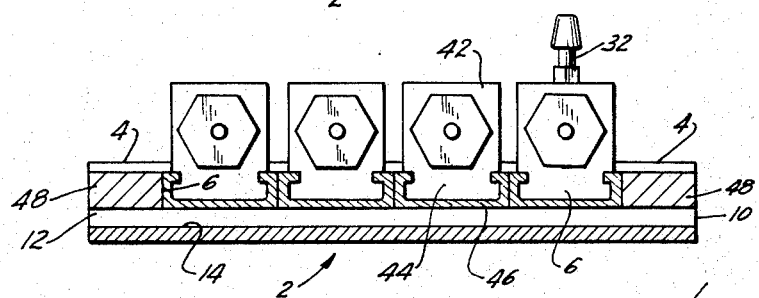
INVENTOR.
AARON KUTZ
BY James F. Franklin
ATTORNEY

FLUID LOGIC MODULE ASSEMBLY WITH BUILT-IN MANIFOLD

The present invention relates to an assembly of fluid logic modules mounted on a base in any desired combination and arrangement, as dictated by the end result required in a given installation, with built-in manifold means being provided on the base in order to facilitate the fluid interconnection of appropriate logic modules.

The use of fluid under pressure, either greater or less than atmospheric, in order to perform desired control functions is becoming more and more widespread, even in situations where fairly complex control functions must be performed. The use of fluid for control purposes is even invading some areas where electronics previously had been thought to be the only practical answer, fluid control having certain advantages over electronic control, particularly with relation to sturdiness, reliability, and relative insensitivity to adverse ambient conditions. However, fluid control has the drawback that it involves the use of control elements which are fairly bulky when compared to the functionally corresponding electronic elements, and from the fact that the fluid-pressure-sensitive elements employed generally required that they be specially constructed for each individual control application. This necessarily makes for great expense, and for excessive delay between design and implementation of a given control system.

In recent years attempts have been made to standardize individual fluid control units so that a given control installation could be composed to as large a degree as possible of individual standardized modules, which could then be operatively connected to one another by means of fluid-pressure conduits so as to function in the desired overall fashion. These standardized modules are designed to perform predetermined functions depending upon the nature of the fluid pressure inputs thereto and the details of the internal construction of the units, and hence these units will hereinafter be termed "logic modules" in view of the fact that the outputs thereof will bear a predetermined relation to the inputs thereto, that relation constituting the "logic" of the module in question.

The more complicated the logic of the assembly, or the greater the number of individual logic operations to be performed by a given assembly, the more complicated is the assembly of the modular units. Each modular unit may, and usually does, have a plurality of input ports and a plurality of output ports, each of those ports being externally connected by tubing or the like to the appropriate input or output ports of other modular units, and when a number of such modular units are employed the problem of making effective fluid pressure interconnection between the modules becomes quite difficult, not only from the point of view of initial assembly, where complexity involves the consumption of much time and the possibility of error, but also insofar as reliability is concerned the greater the number of external piping connections which must be made, the more likely are leaks or dislocations of the pressure connections.

It is a prime object of the present invention to facilitate the use of logic modules of the fluid-pressure type in various combinations as dictated by particular operational or functional requirements.

It is another object of the present invention to provide a mounting support specially designed for the reception of various combinations of more or less standardized fluid logic modules.

It is yet another object of the present invention to provide a fluid logic mounting unit so constructed as to minimize the number of external fluid connections which must be made in a given assembly of fluid logic modules, and to facilitate the ease with which the necessary external connections can be made.

It is yet a further object of the present invention to provide a mounting unit for fluid logic modules which greatly expands the flexibility of use of those modules in order to perform complicated logic functions or a multiplicity of different logic functions.

To these ends, a mounting base is provided on which different kinds of fluid logic modules may readily be mounted in various arrangements and combinations as dictated by the requirements of the particular installation involved. Thus track means may be provided on the base, the standardized modules having mounting structure which cooperates with the tracks on the base so that those modules may be positioned on the base as desired, and then be secured in that desired position. The mounting base is further provided with a preferably built-in manifold passage, and ports to that passage are exposed on a given surface of the mounting base, preferably a surface open and accessible to the modules which have been mounted on the base. This manifold passage thus provides means for connecting a given pressure source to a plurality of modules, which connection is usually called for in any installation of significant complexity. The manifold passage may extend through the entire length of the mounting base and be exposed at both ends thereof, so that the pressure source may be connected to the manifold passage at whichever end is most convenient for a given installation, the other end then being blocked or, if desired, provided with another exposed port to which external connection can be made. As a result of this arrangement, a given base will support a wide variety of different numbers, types and combinations of fluid logic modules and will facilitate the making of external fluid connections therebetween.

To the accomplishment of the above, and to such other objects as may hereinafter appear, the present invention relates to a fluid logic assembly as defined in the appended claims and as described in this specification, taken together with the accompanying drawings, in which:

FIG. 1 is a three-quarter perspective view of an exemplary assembly of fluid logic modules mounted on a specially constructed base, only some of the fluid port fittings being shown and only some of the external fluid connections being shown in order that the illustration will be more meaningful;

FIGS. 2 and 3 are cross sectional views taken respectively along the lines 2—2 and 3—3 of FIG. 1; and FIG. 4 is a schematic diagram of the exemplary logic assembly shown in FIG. 1, in which the nature of the various modules illustrated in FIG. 1 are shown and in which all of the fluid pressure connections between those modules are shown.

Turning now to the structure shown in FIGS. 1 – 3, a base generally designated 2 and formed of some suitable structural material such as metal or molded plastic is provided on its upper face 4 with a longitudinally extending channel or recess 6 with undercut sides 8, thereby defining a track extending from one end 10 of the base to the other end 12 thereof. The bottom of this track is preferably provided with an additional downwardly recessed portion 14. Similar tracks, generally designated 16 and 18, but, as here shown, without the recessed portion 14 of the track 6, may be provided along the sides of the base. The left hand portion of the base 2 (as viewed in FIGS. 1 and 2) is of appreciable height and width, and is provided with a manifold passage 20 extending therethrough, preferably from one end thereof to the other. The upper surface 4 of that portion of the base 2 provided with the passage 20 is provided with a plurality of ports 22 extending down to and communicating with the passage 20. These ports 22 may be pre-formed in the base 2 at appropriate positions, or at the time of system assembly at positions appropriate to each individual application by a simple drilling operation. These ports 22, whether preformed or made as and where desired, may be provided with fittings 24, of conventional type, to which external tubing may be connected. When the ports 22 are preformed, and if some of those ports are not to be used in a given installation, suitable plugs, also conventional, may be used to close and seal those ports 22 the use of which is not called for.

Fluid pressure connection from some external fluid pressure source (with pressure either greater or less than atmospheric) may be made through one of the fittings 24 communicating with a port 22. However, because the pressure source adapted to communicate with the manifold passage 20 will usually be of appreciable capacity in order to feed a plurality of external units, it is usually preferable to connect that external fluid source with the manifold passage 20 by means of a larger fitting, such as the elbow type fitting 26, also of relatively conventional construction, which may be sealingly screwed into an end of the passage 20. The other end of the passage 20 may be closed by means of a plug 28 screwed thereinto, or, if desired, an additional inlet or outlet fitting such as the elbow fitting 26 may be sealingly screwed thereinto.

The tracks 6, 16 and 18 are adapted to mount individual fluid logic modules, those modules being provided with mounting means cooperating with the track structure in question. The nature of these modules may vary widely, and what is here illustrated in a specific assembly are a variety of different types of modules which is by no means exclusive, but which have been selected more or less at random in order to illustrate the flexibility of use of the assembly here described. Therefore it must be clearly understood that the particular nature of these modules, considered either singly or in combination, forms no part of this invention, the value of the inventive structure here disclosed deriving in large part from the fact that a virtually unlimited choice and combination of modules can be effected through its use.

Mounted in the track 6 are a plurality of air relay modules generally designated 30. These modules are designed to have a working pressure applied to an input, that working pressure differently affecting the working output depending upon the particular control pressures applied to the control inputs. The air relay 30A which is illustrated in FIG. 1 with associated fluid connections, is of a simplified type having a single control input port 32 (the reference numbers here and elsewhere, except when otherwise described, relate indiscriminately to a port and the fitting associated with that port), a working pressure input port 34, a pair of working pressure output ports 36 and 38, and a vent port 40 (usually located in the bottom face of the relay 30, and hence not visible in FIGS. 1 – 3; it is, however, schematically indicated in FIG. 4 by means of a triangle). As may be seen in the schematic diagram, FIG. 4, a spring 41 is inside the relay 30A, normally putting it in one operative position, as indicated by the schematic block 30', the arrows in that block indicating the connections between working ports 34, 36, 38 and 40, the presence of pressure at the control input 32 causing the port interconnections to shift to that shown in block 30''.

The other air relays 30 differ from relay 30A in that, instead of the spring 41, they have a second control pressure input port 32', with the operative interconnections when control pressure is applied at ports 32' and 32 respectively being shown in the squares 30' and 30'' respectively.

Each of the relays 30 comprises a body 42 provided at its lower end with a keyway 44. The length of the bodies 42 is slightly less than the width of the slot 6. A channel-shaped adaptor 46 is adapted to be slidably received over the keyway 44, the length of the adaptor 46 being slightly greater than the length of the bodies 42 and its height being such that it is received within the undercut portion 8 of the slot 6. Thus each air relay 30 is mounted on an adapter 46 and is then slid into the track 6, being retained vertically in the track 6 by means of the adaptors 46. The adaptors 46 are provided with openings 47 adapted to register with the vent openings 40 in the bottom of the bodies 42, thereby to permit those vent openings 40 to freely communicate with the atmosphere via track recess 14. The ends of the track 6 are closed by blocking elements 48 of a length and height such as to have their ends received in the undercut track portions 8, the blocking elements 48 being provided with set screws 50 extending down therethrough and engageable with the upper surface of the slot 6 in order to lock the blocking elements 48 in position.

Different elements are mounted on the tracks 16 and 18. As here specifically disclosed, on the track 16 a multi-port module 52 and a connection board module 54 are mounted, those modules having keyways formed on their bodies which are slidably received in the tracks 16, those modules being held in place on the tracks by means of blocking elements 56 provided with set screws 58 similar in structure and function to the blocking elements 48 except that they are shaped to be received in the tracks 16. The multi-port module 52 is provided with a plurality of ports 60 which communicate internally with one another, while the connection board module 54 is provided with individual pairs of communicating ports 62. On the track 18 are mounted a flow control module 64, a shuttle valve module 66 and another multi-port module 68, all held in place on the track 18 by blocking elements 56. The mounting structure for the modules and blocking elements in track 18 is the same as has been described for the modules and blocking elements of track 16. The flow control module 64 provides for adjusting the freedom of fluid flow therethrough, in this specific arrangement in one direction, by manual adjustment at 70, the shuttle valve module 66 provides for fluid output at port 72 depending upon whether fluid input comes to port 74 or port 76, the other port then being blocked, while multiport module 68 provides for interconnection between its ports 78.

After the desired modules have been assembled on the base 2, fluid interconnection between the ports or fittings thereon is made by any suitable means, such as flexible tubes 80 sealingly connected to and extending between a given pair of fittings. The fittings 24 which communicate with the manifold passage 20 in the base 2 in this instance are utilized to provide working pressure to the air relays 30, and therefore four such manifold outlet fittings 24 are provided, each located adjacent a different air relay 30. The external source of working pressure is connected to the elbow fitting 26 in any appropriate fashion, and each manifold fitting 24 is connected by tubing 80 to the working input fitting 34 of the corresponding air relay 30. It will be appreciated that because the external working pressure source must energize a plurality of air relays 30, it is desirable that the pressure conduit leading to the assembly be greater in size than the pressure conduits going to each individual working pressure input port 34 of the various air relays 30. This usually presents a problem in assembly, but the construction here disclosed solves that problem. The manifold passage 20 is relatively large, and the fitting 26 communicating therewith, and to which the external pressure source is connected, is likewise large in cross section, whereas the individual tube connections 80 from the manifold fittings 24 to the appropriate ports of the corresponding air relays 30 are appropriately small.

It will therefore be seen that through the use of the mounting base here disclosed a large number of different types of fluid logic modules may be assembled in different permutations and combinations as determined by requirements of a given installation, that the assembly may thereafter be handled as a unit, that appropriate fluid pressure interconnections may readily be made, that those connections will be reliable, that the complexity of those connections is greatly decreased over that which has heretofore been required, and that individual modules may readily be removed and replaced without having to disturb the fluid connections to the other units.

While but a single embodiment of this invention has been here specifically disclosed, it will be apparent that many variations may be made therein, all within the scope of the instant invention as defined in the following claims.

I claim:

1. A fluid logic assembly comprising a base, mounting means extending along said base effective to receive and hold a plurality of fluid-action modules having fluid ports so that said fluid ports thereon are exposed, said base having a manifold passage extending therethrough substantially along said mounting means and spaced laterally from said mounting means, and fluid ports on said base communicating between said manifold passage and the exterior of said base, whereby external fluid connections can be made between said base ports and said module ports, in which said mounting means comprises first track means on the upper face of said assembly and second track means on the side of said assembly.

2. The assembly of claim 1, in which said fluid ports are exposed on the upper face of said assembly.

3. A fluid logic assembly comprising a base, mounting means extending along said base effective to receive and hold a plurality of fluid-action modules having fluid ports so that said fluid ports thereon are exposed, said base having a manifold passage extending therethrough substantially along said mounting means and spaced laterally from said mounting means, and fluid ports on said base communicating between said manifold passage and the exterior of said base, whereby external fluid connections can be made between said base ports and said module ports, in which said mounting means comprises first track means on the upper face of said assembly and second track means on the side of said assembly, said track means comprising a recess with undercut sides.

4. The assembly of claim 3, in which said fluid ports are exposed on the upper face of said assembly.

* * * * *